O. R. HUNT.
ARTICLE COMPRISING CLIP CONNECTED RELATIVELY MOVABLE ELEMENTS.
APPLICATION FILED MAR. 25, 1918.

1,283,194. Patented Oct. 29, 1918.

Witnesses:
Inventor:
Ozello R. Hunt,

UNITED STATES PATENT OFFICE.

OZELLO R. HUNT, OF CHICAGO, ILLINOIS, ASSIGNOR OF ONE-FOURTH TO CHARLES W. SNELL AND ONE-FOURTH TO FREEMAN E. BROWN, BOTH OF CHICAGO, ILLINOIS.

ARTICLE COMPRISING CLIP-CONNECTED RELATIVELY MOVABLE ELEMENTS.

1,283,194.     Specification of Letters Patent.     Patented Oct. 29, 1918.

Application filed March 25, 1918. Serial No. 224,610.

*To all whom it may concern:*

Be it known that I, OZELLO R. HUNT, a citizen of the United States, residing at Chicago, in the county of Cook and State of Illinois, have invented a new and useful Improvement in Articles Comprising Clip-Connected Relatively Movable Elements, of which the following is a specification.

I have devised my improvement for use, more particularly, in connection with spring structures such as mattresses, cushions, or the like, involving coil-springs of relatively small diameter and, more especially, though not exclusively, to structures wherein the coil-springs are grouped together within a frame, as for example of steel wire, which operates to cause the edges of the spring structure to present the desirable degree of rigidity to prevent sagging.

In structures of this kind, it is desirable that the spring elements be connected with adjacent elements in such a way that they may have the desired movement, but shall not become overlapped, in the action to which they are subjected when weight is placed upon and removed from the spring structure, such overlapping being possible where the connecting medium is pivotally connected with both of the elements connected together thereby.

My primary object is to provide in connection with the springs of such structures, a simple, economical, and positively operating connecting-means by which spring elements may be connected with adjacent elements in a manner to prevent the objectionable overlapping of adjacent elements.

Figure 1:
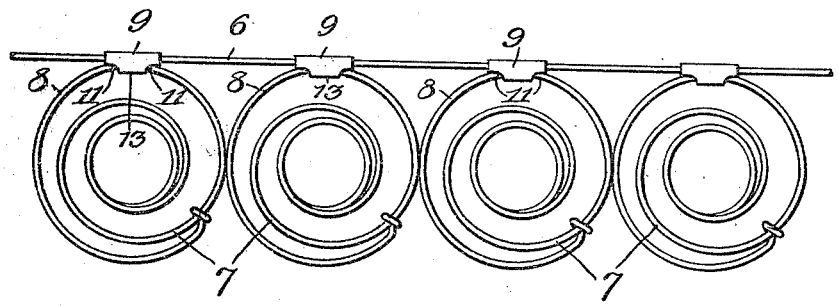
Figure 2:
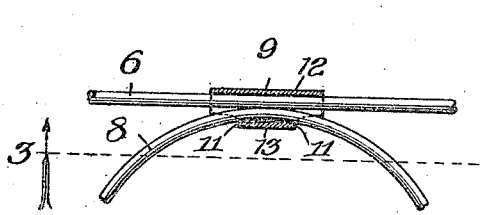
Figure 3:
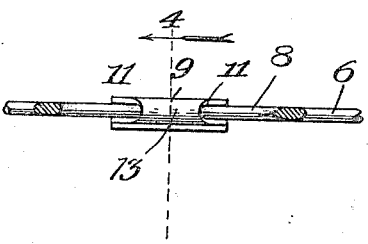
Figure 4:
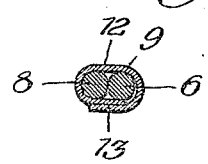

Referring to the drawing, Figure 1 is a plan view of a portion of a coil-spring cushion of the type involving a surrounding frame structure for the purpose hereinbefore stated, the structure shown embodying my invention. Fig. 2 is an enlarged plan view of a portion of the frame of Fig. 1, a portion of an adjacent spring and a clip device shown in section connecting them together. Fig. 3 is a view taken at the line 3 on Fig. 2 and viewed in the direction of the arrow. Fig. 4 is an enlarged section taken at the line 4 on Fig. 3 and viewed in the direction of the arrow; and Fig. 5, a perspective view of the blank from which the connecting clip is formed.

My invention has particular application to a spring structure of the general character above stated, and, therefore, I have chosen to illustrate it in such connection, showing in Fig. 1 a fragment of such a spring cushion, as this will serve to illustrate the invention. According to the showing, one of the side wires of the rectangular frame which surrounds the group of coil-springs, is represented at 6. The adjacent ones of the springs grouped within this frame are represented at 7, these springs being of the variety commonly used and as shown, of the hourglass type, and presenting the substantially circular convolutions 8. Each of the springs 7 is connected at its convolution 8 with the wire 6, through the medium of a clip device 9, the springs 7 being connected together at their adjacent portions in any suitable manner, not shown.

Figure 5:
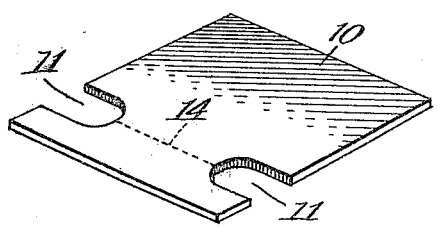

The clips 9 are formed from blanks like that represented at 10 in Fig. 5 and which is preferably of ductile metal, adapting it to be bent to the desired form, the clip being provided at opposite edges and adjacent one end thereof with notches 11, these notches reaching short of the edges of the blank extending at angles to those edges in which the notches 11 are located, or, in other words, each notch opens through one edge only of the blank, as distinguished from being cut from a corner of the blank. In assembling the clips with the wire 6 and springs 7, the blank 10 is applied to the wire 9 and the spring to be connected therewith and the blank bent into the form shown in Fig. 4 to a position wherein the arc-shaped portion 8 of the spring lies between the upper and lower wall portions 12 and 13 of the clip and extend through the notches 11, as represented in Fig. 2, the blank, in thus applying it to the elements as stated, being bent along a line substantially midway between the ends of the notches 11, as indicated at the dotted line 14 in Fig. 5. In applying the clip 9 to the elements, as stated, the clip is drawn tightly into engagement with these elements to cause the clips 9 and the springs 7 to be relatively non-movable.

As hereinbefore stated, this particular invention has to do only with coil-springs of relatively small diameter. In such case, the arc described by the convolutions 8 is so abrupt and the interlocking of the curved portions of the convolutions 8 with the upper and lower portions of the clip adjacent its notched portions, is such, that it is entirely commercially feasible and practicable to connect these elements together as explained to secure relative rigidity between the spring and clip.

It will be understood that if desired, the spring and wire connecting feature shown in the drawing and herein just described may be employed as the connecting medium for adjacent springs, wherein one spring pivotally connects with the clip, though in such case it would be desirable to provide the spring which is to pivotally engage the clip, with a straight portion to be encircled by the clip, as in the case of the wire 6.

While I have illustrated and described a particular embodiment of my invention, I do not wish to be understood as intending to limit it thereto, as the same may be variously modified and altered without departing from the spirit of my invention.

What I claim as new and desire to secure by Letters Patent is—

In a structure comprising relatively movable elements, one of said elements being a coil-spring of relatively small diameter, a clip connected to the first of said elements, said clip having outwardly opening notches in its opposite edges and intermediate its ends, each of said notches forming shoulders at opposite sides of the clip, both of which extend laterally beyond the base of said notch, the said clip being adapted to be looped over an arc-shaped convolution of the spring, such portion of the spring embraced by the clip extending in the said notches and interlocking with said shoulders, the end portions of the clip beyond said notches surrounding said relatively movable elements to cause the clip and the coil-spring to be relatively non-movable.

OZELLO R. HUNT.

Copies of this patent may be obtained for five cents each, by addressing the "Commissioner of Patents, Washington, D. C."